US012322530B2

(12) United States Patent
Yuan

(10) Patent No.: US 12,322,530 B2
(45) Date of Patent: Jun. 3, 2025

(54) ILLUMINATION FLAT CABLE DEVICE

(71) Applicant: PHANTEKS GROUP INC., New Taipei (TW)

(72) Inventor: Jin-Jong Yuan, New Taipei (TW)

(73) Assignee: PHANTEKS GROUP INC., New Taipei (TW)

( * ) Notice: Subject to any disclaimer, the term of this patent is extended or adjusted under 35 U.S.C. 154(b) by 145 days.

(21) Appl. No.: 18/216,048

(22) Filed: Jun. 29, 2023

(65) Prior Publication Data

US 2025/0006403 A1 Jan. 2, 2025

(51) Int. Cl.
*H01B 7/08* (2006.01)
*F21V 5/00* (2018.01)
*F21V 7/00* (2006.01)
*F21V 19/00* (2006.01)
*F21Y 115/10* (2016.01)

(52) U.S. Cl.
CPC ............. *H01B 7/0823* (2013.01); *F21V 5/00* (2013.01); *F21V 7/0066* (2013.01); *F21V 19/0015* (2013.01); *F21Y 2115/10* (2016.08)

(58) Field of Classification Search
CPC ....... H01B 7/0823; F21V 5/00; F21V 7/0066; F21V 19/0015; F21V 7/00; F21V 33/00; F21Y 2115/10; F21Y 2103/10; F21S 4/28
See application file for complete search history.

(56) References Cited

U.S. PATENT DOCUMENTS 10,794,552 B2 * 10/2020 Lin ...................... G02B 6/0068
2005/0074223 A1 * 4/2005 Moore ................. H02G 3/0481 385/147
2020/0096690 A1 * 3/2020 Lin ...................... G02B 6/0096
2023/0377772 A1 * 11/2023 Zhang ....................... F21K 9/00

* cited by examiner

*Primary Examiner* — Bao Q Truong
(74) *Attorney, Agent, or Firm* — Chun-Ming Shih; HDLS IPR SERVICES

(57) ABSTRACT

This disclosure is directed to an illumination flat cable device having a light-transmissive frame of a flat shape, a reflective cover, an illumination strip and a flat cable. The light-transmissive frame has an illumination side, an illumination channel at the illumination side, a cabling side, and cable channels on the cabling side. Each cable channel is disposed in parallel with the longitudinal direction of the light-transmissive frame. The reflective cover on the illumination side has a reflective surface covering the illumination channel. The illumination strip in the illumination channel has a projecting direction disposed toward the reflective surface. The flat cable has conductive wires respectively disposed in the cable channels and a pair of connectors. The light-transmissive frame has a pair of end portions disposed corresponding to the pair of connectors.

9 Claims, 7 Drawing Sheets

ILLUMINATION FLAT CABLE DEVICE

BACKGROUND OF THE DISCLOSURE

Technical Field

This disclosure is directed to a flat cable, and in particular to an illumination flat cable device.

Description of Related Art

In usual, a related-art flat cable used for power supplying or signal transferring are not illuminable, and an additional illumination line should be arranged to make the flat cable illuminable. In a related-art illuminable line structure, the illumination line is provided with a light emitting diode component at one end thereof and a reflective element at the other end thereof, and a light guide strip is connected between the light emitting diode component and the reflective component, so that the light guide strip is capable of guiding light from the light emitting diode component and the reflector. However, the illumination of the related-art illuminable line tends to decrease with a length increasing of the illuminable line, so that the illumination and application of the illuminable line are therefore limited. Moreover, the light from the light guide strip is limited by the light emitting diode components connected thereto and unable to perform various types of light.

In view of the above drawbacks, the inventor proposes this disclosure based on his expert knowledge and elaborate researches in order to solve the problems of related art.

SUMMARY OF THE DISCLOSURE

This disclosure is directed to an illumination flat cable device with uniform illumination.

This disclosure is directed to an illumination flat cable device having a light-transmissive frame, a reflective cover, an illumination strip, and a flat cable. The light-transmissive frame is of a flat shape, the light-transmissive frame has an illumination side and a cabling side opposite to the illumination side, the light-transmissive frame has a illumination channel arranged at the illumination side, the light-transmissive frame has a longitudinal direction in parallel with the illumination channel, the light-transmissive frame has a plurality of cable channels arranged on the cabling side, each cable channel is disposed in parallel with the longitudinal direction of the light-transmissive frame. The reflective cover is arranged on the illumination side of the light-transmissive frame, the reflective cover has a reflective surface, and the reflective surface is configured to cover the illumination channel. The illumination strip is arranged in the illumination channel, and the illumination strip has a projecting direction disposed toward the reflective surface. The flat cable has a plurality of conductive wires in parallel with each other and a pair of connectors, the conductive wires are disposed in the cable channels respectively, the light-transmissive frame has a pair of end portions, and the pair of connectors are disposed corresponding to the pair of end portions respectively.

One of the exemplary embodiments, the illumination flat cable device further has a pair of clampers, the pair of clampers are disposed on the end portions respectively, and the light-transmissive frame and the reflective cover are clamped by the clampers. Each of the clampers has a first housing and a second housing, the first housing is connected with the reflective cover, the second housing is configured to cover the cabling side of the light-transmissive frame, and the first housing is buckled with the second housing. Each of the clampers has a plurality of passages corresponding to the conductive wires, and the conductive wires are inserted in the passages respectively.

One of the exemplary embodiments, the illumination strip has a circuit board and a plurality of light emitting diodes, the circuit board has an illumination surface, the light emitting diodes are disposed on the illumination surface, the circuit board is accommodated in the illumination channel and the illumination surface is disposed to face the reflective surface of the reflective cover. The light emitting diodes are disposed in parallel with the longitudinal direction of the light-transmissive frame. A reflective unit is attached in the reflective cover, and the reflective surface is disposed on the reflective unit. Each of the clampers has a tenon, a mortise is defined on the reflective cover corresponding to the tenon, and the tenon is engaged in the mortise.

One of the exemplary embodiments, at least a part of the conductive wires is exposed from the cabling side of the light-transmissive frame.

According to this disclosure, the illumination flat cable device has the reflective surface for reflecting light projected from the illumination strip, so that the light may be uniformly spread from back sides of the conductive wires through the light-transmissive frame.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
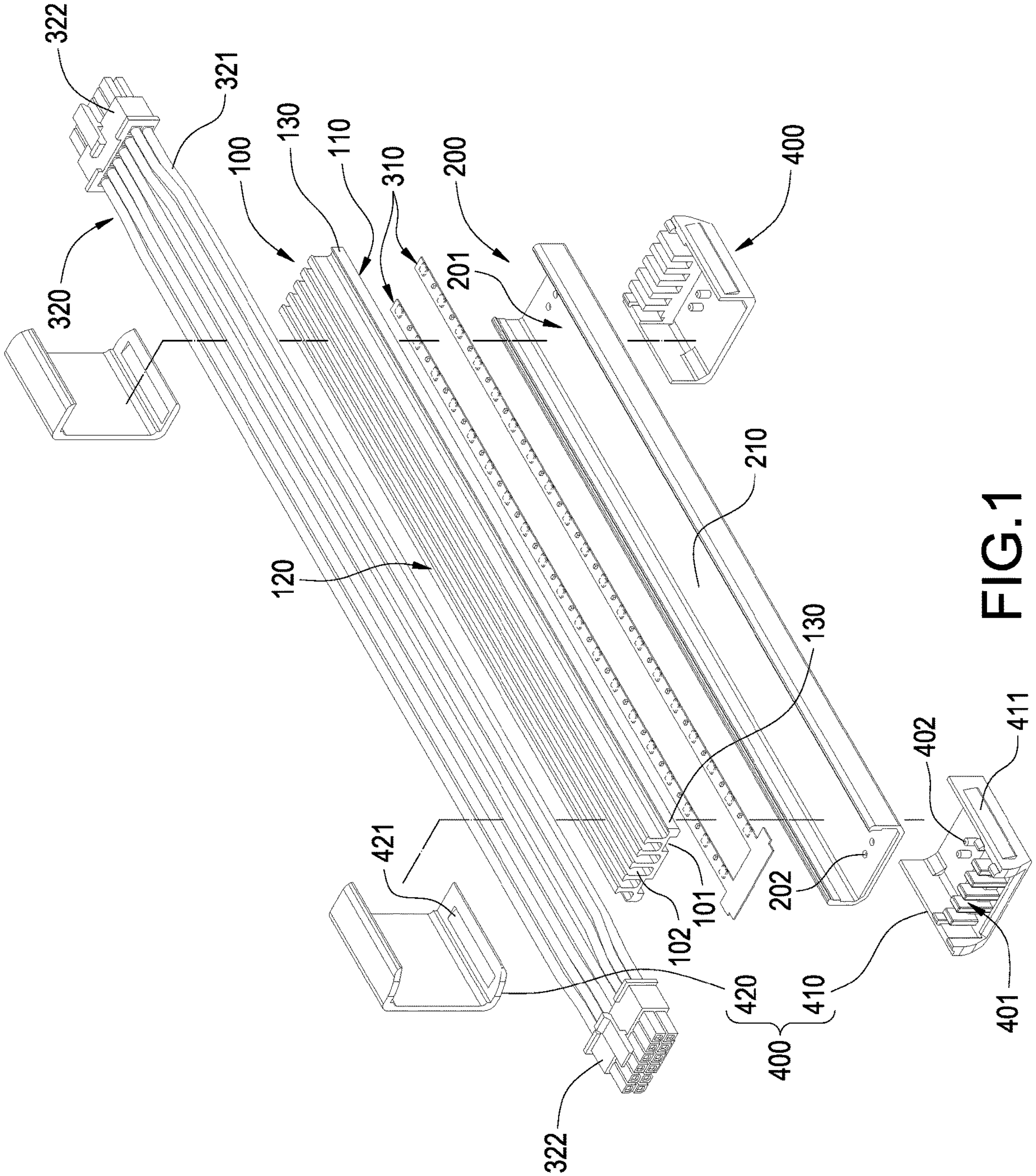
FIG. 1 is an exploded view showing an illumination flat cable device according to this disclosure.
Figure 2:
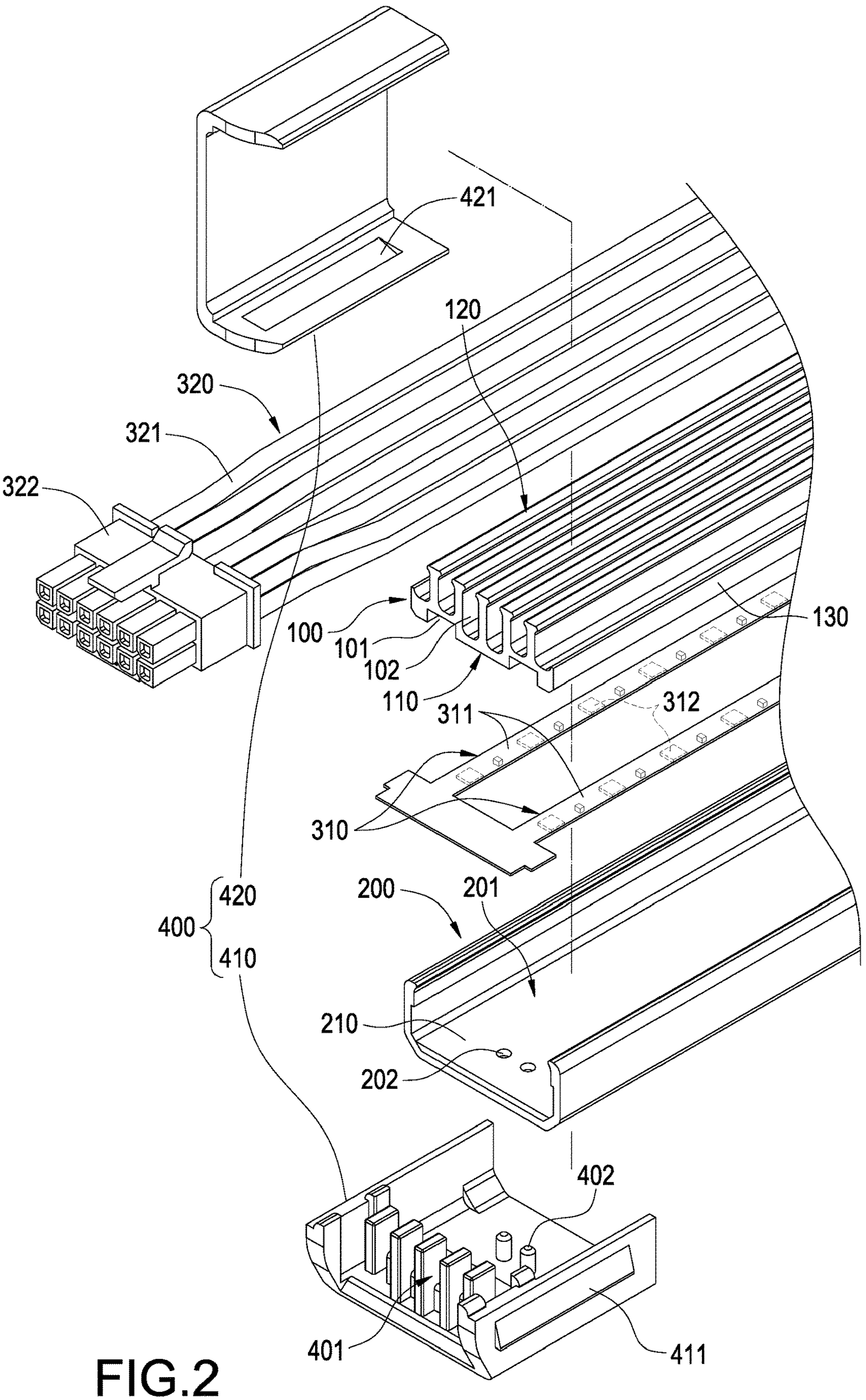
FIG. 2 is a partially enlarged view of FIG. 1.
Figure 3:
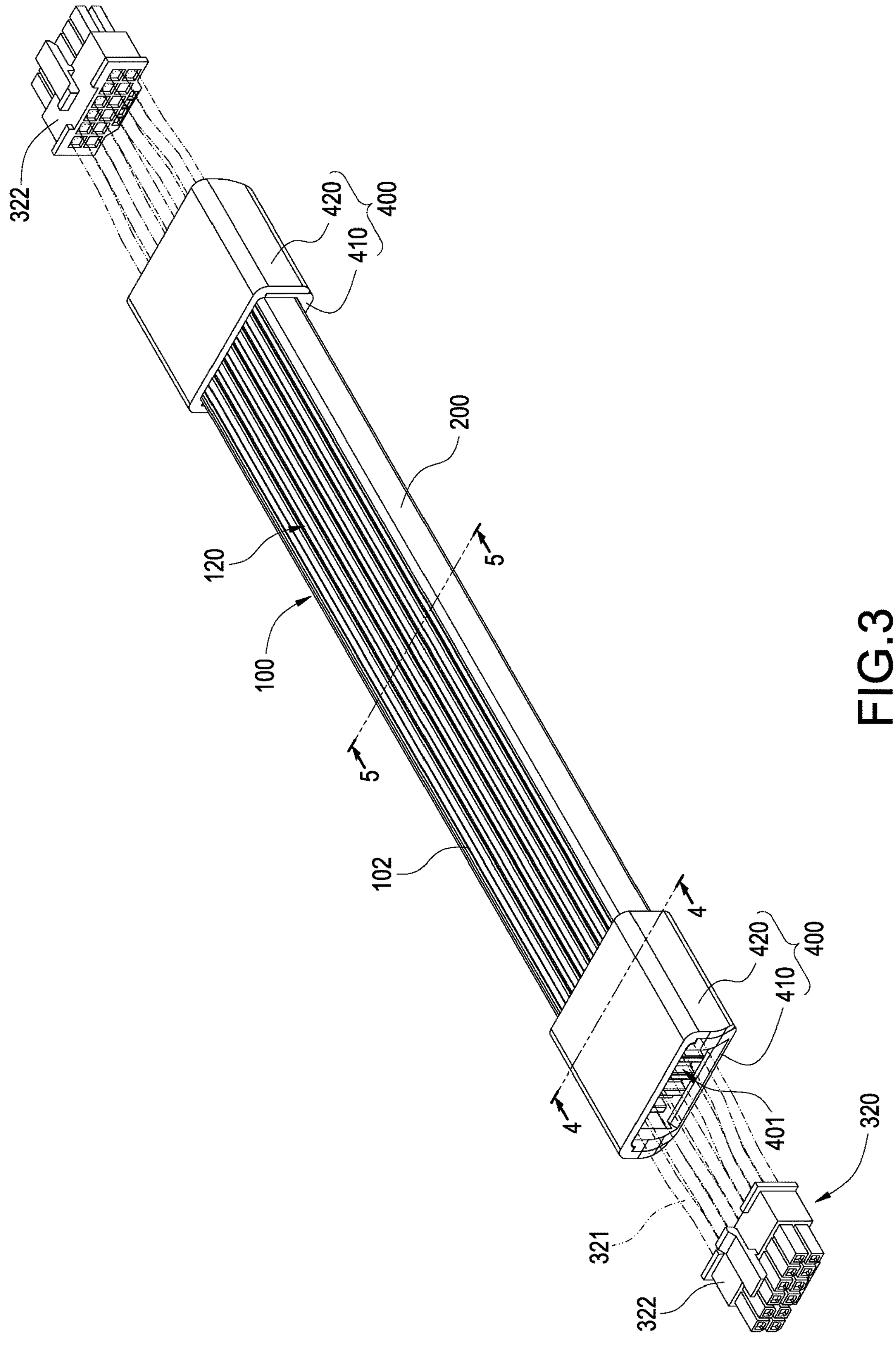
FIG. 3 is a perspective view showing the illumination flat cable device according to this disclosure.

According to an embodiment of this disclosure as shown in FIGS. 1 to 3, an illumination flat cable device used for transferring power or signal is provided, the illumination flat cable device has a light-transmissive frame 100, a reflective cover 200, an illumination strip 310 and a flat cable 320.

The light-transmissive frame 100 is of a flat and elongated shape, the light-transmissive frame 100 has a pair of end portions 130, an illumination side 110 and a cabling side 120. The illumination side 110 and the cabling side 120 are disposed on the light-transmissive frame 100 and opposite to each other. The light-transmissive frame 100 has at least one illumination channel 101 and a plurality of cable channels 102, the illumination channel 101 is disposed at the illumination side 110, and the illumination channel 101 is extended to be in parallel with a longitudinal direction of the light-transmissive frame 100. The cable channels 102 are disposed at the cabling side 120, and each cable channel 102 is extended to be in parallel with the longitudinal direction of the light-transmissive frame 100.

According to FIGS. 1 and 2, the reflective cover 200 is disposed at the illumination side 110 of the light-transmissive frame 100, the reflective cover 200 has a reflective surface 201, the reflective surface 201 is disposed on an internal surface of the reflective cover 200, and the reflective surface 201 covers the illumination channel 101. According to this embodiment, a reflective unit 210 is attached in the reflective cover 200, and the reflective surface 201 is formed on the reflective unit 210. Specifically, the reflective unit 210 may be a plate, a sticker, or a coating layer. The reflective surface 201 should not be limited to the aforementioned embodiment. For example, the reflective surface 201 may be a smooth surface formed on the internal surface of the reflective cover 200.

According to a simplest embodiment as shown in FIGS. 1 and 2, the expected effects of this disclosure may be achieved via single illumination strip 310, but number of the illumination strip 310 should not be limited in this disclosure. For example, two illumination strips 310 with the same structures and functions are provided in this embodiment, and the structures of the illumination strips 310 are connected with each other. The aforementioned illumination channel 101 and the illumination strip 310 are disposed correspondingly in number, namely, the number of the illumination channels 101 should not be less than that of the illumination strips 310, the illumination strips 310 are disposed in the illumination channels 101 respectively, and the illumination strip 310 has a projecting direction disposed toward the reflective surface 201.

Figure 5:
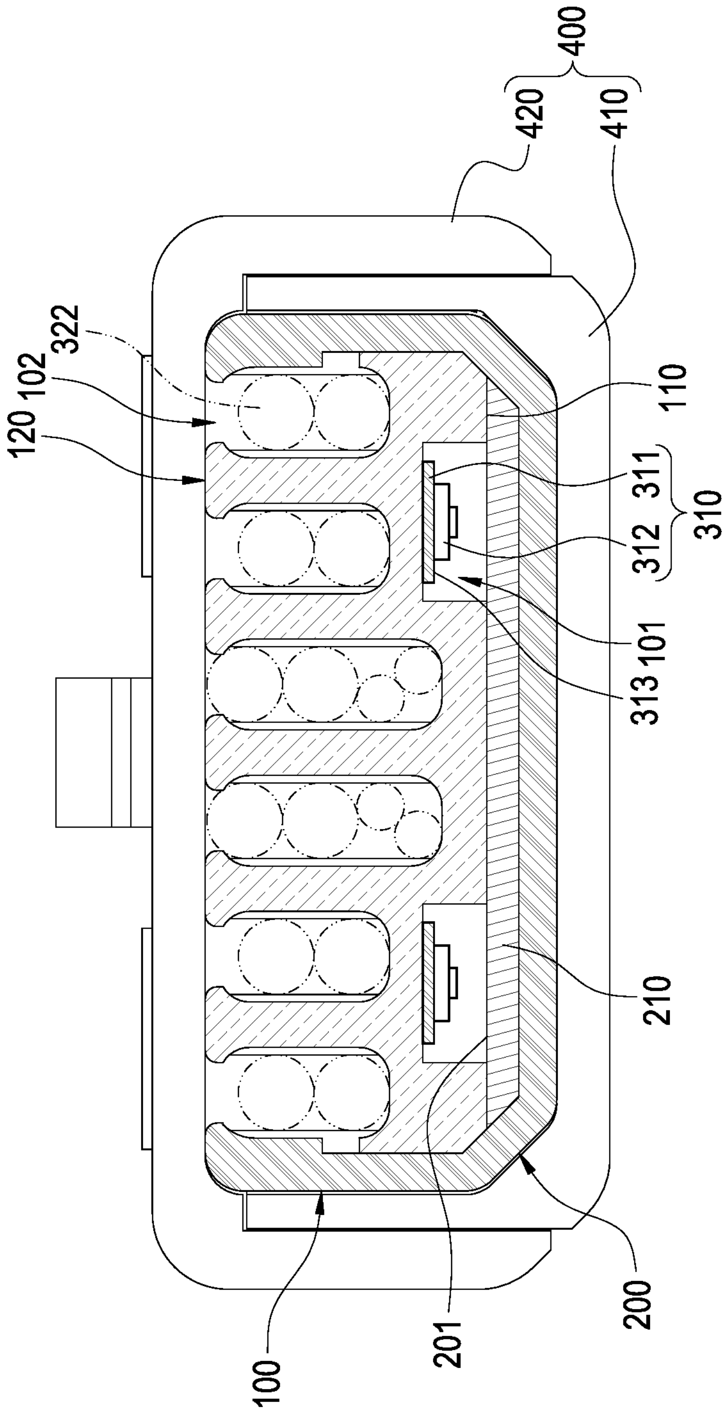
FIG. 5 is another lateral cross-sectional view of the flat cable device according to this disclosure.
Figure 6:
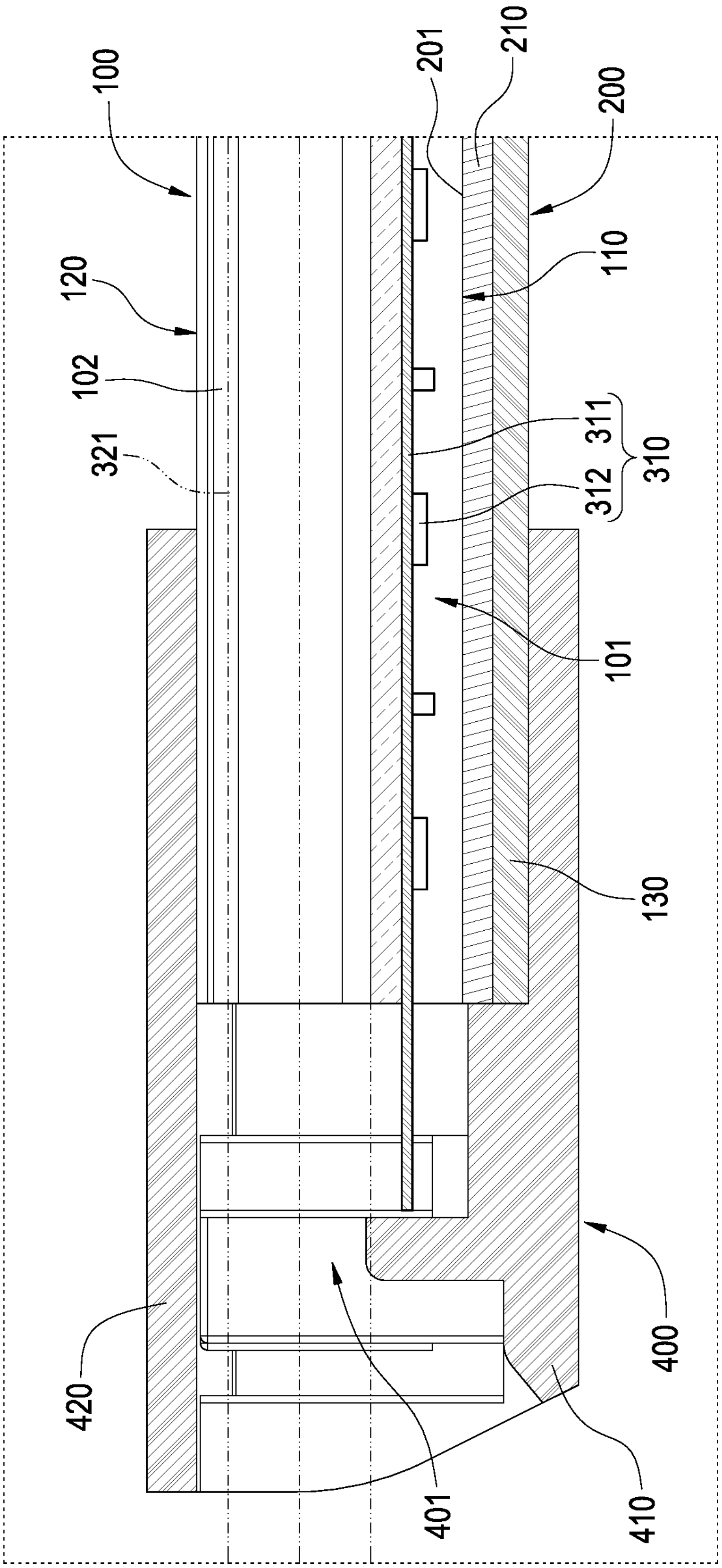
FIG. 6 is a longitudinal cross-sectional view of the flat cable device according to this disclosure.

According to FIGS. 4 to 6, in order to illustrate the illumination strip 310, only one of the illumination strips 310 is taken as an example in the following paragraphs. The illumination strip 310 has a circuit board 311 and a plurality of light emitting diodes 312, the circuit board 311 has an illumination surface 312, the light emitting diodes 312 are disposed on the illumination surface 312. The circuit board 311 is accommodated in the illumination channel 101 and the illumination surface 312 is disposed to face the reflective surface 201 of the reflective cover 200, so that the illumination strip 310 is disposed to project light toward the reflective surface 201, and the light emitting diodes 312 are disposed in a line in parallel with the longitudinal direction of the light-transmissive frame 100, so that the light is spread along the longitudinal direction of the light-transmissive frame 100 with uniform illumination, and the light emitting diodes 312 may be disposed with various colors.

According to FIGS. 1 to 3, the flat cable 320 has a plurality of conductive wires 321 arranged side by side and a pair of connectors 322, the conductive wires 321 are disposed in the cable channels 102 respectively. According to FIGS. 4 and 5, specifically, each cable channel 102 is capable of accommodating at least one conductive wire 321, and at least a part of the conductive wires 321 are exposed from the cabling side 120 of the light-transmissive frame 100. According to FIGS. 1 to 3, the pair of connectors 322 are respectively disposed corresponding to the pair of end portions 130 of the light-transmissive frame 100, namely, the pair of connectors 322 may be fixed to the pair of end portions 130 of the light-transmissive frame 100. Alternatively, the connectors 322 may be correspondingly disposed outside of the end portion 130 of the light-transmissive frame 100 without being directly connected with the end portion 130.

According to this embodiment shown in FIG. 1, the illumination flat cable device may further have a pair of clampers 400, the pair of clampers 400 are respectively disposed on the pair of end portion 130 of the light-transmissive frame 100, and the light-transmissive frame 100 and the reflective cover 200 are clamped by the clampers 400 so as to be fixed. Each clamper 400 is illustrated in following paragraph, two clampers 400 may have the same or symmetric structures, only one of the clampers 400 is taken as an example in following paragraphs for illustrating the clampers 400.

Figure 4:
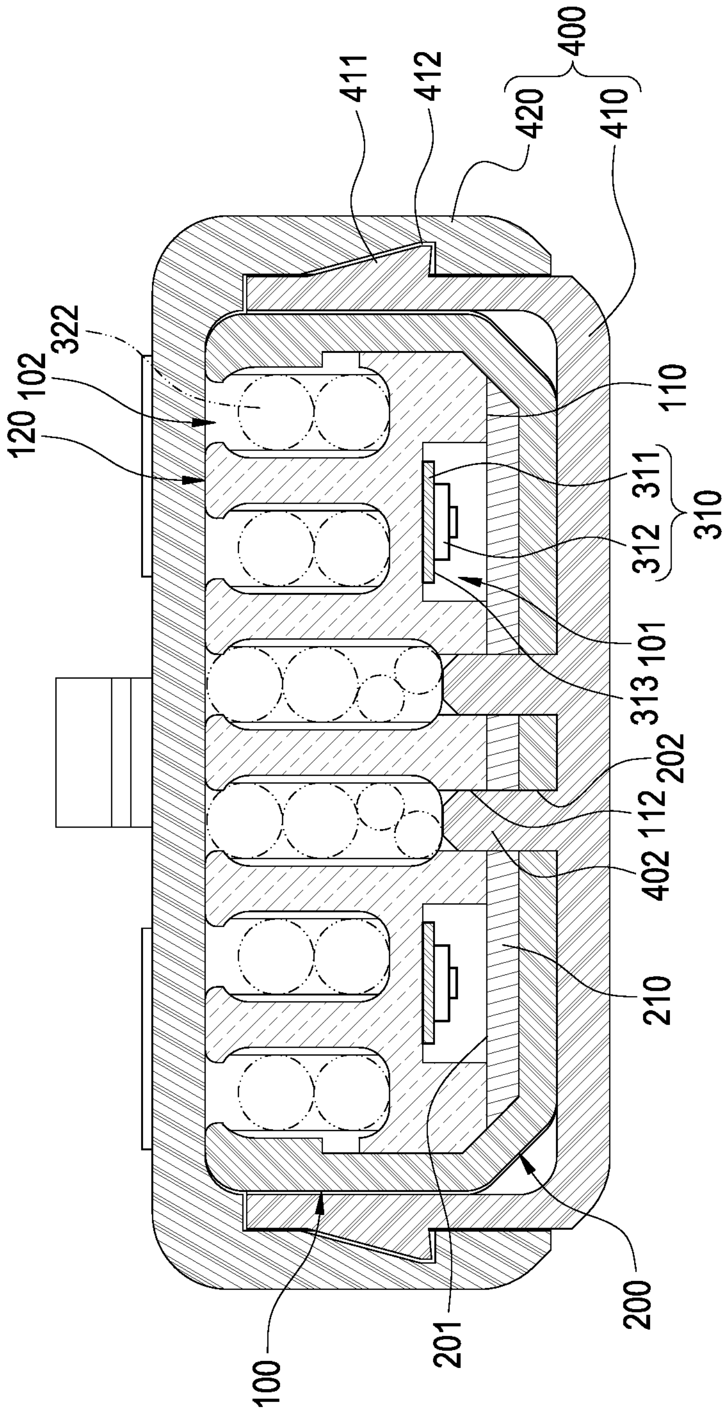
FIG. 4 is a lateral cross-sectional view of the flat cable device according to this disclosure.

According to FIGS. 2 to 4, specifically, the clamper 400 has a first housing 410 and a second housing 420, the first housing 410 is connected with the reflective cover 200, the second housing 420 covers the cabling side 120 of the light-transmissive frame 100, and the first housing 410 is buckled with the second housing 420. According to this embodiment, a latch 411 and a latched hole 421 are respectively disposed on the first housing 410 and the second housing 420 for buckling, positions of the latch 411 and the latched hole 421 are interchangeable, and the buckling should not be limited to the type illustrated in the aforementioned embodiment.

According to FIGS. 2 and 3, each clamper 400 has a plurality of passages 401, the passages 401 are disposed corresponding to the conductive wires 321, and the conductive wires 321 are respectively inserted in the passages 401. Moreover, according to FIGS. 1, 2 and 4, each clamper 400 has a tenon 402, a mortise 202 is defined on the reflective cover 200 corresponding to each tenon 402, and the tenons 402 are engaged with the mortises 202 correspondingly, thereby fixing the clamper 400 with the reflective cover 200. According to FIG. 4, the light-transmissive frame 100 may has a positioning hole 112 disposed on the illumination side 110 corresponding to each tenon 402, each tenon 402 is inserted through the mortise 202 corresponding thereto and then engaged with the positioning hole 112 corresponding thereto so that the light-transmissive frame 100 and the reflective cover 200 are positioned.

Figure 7:
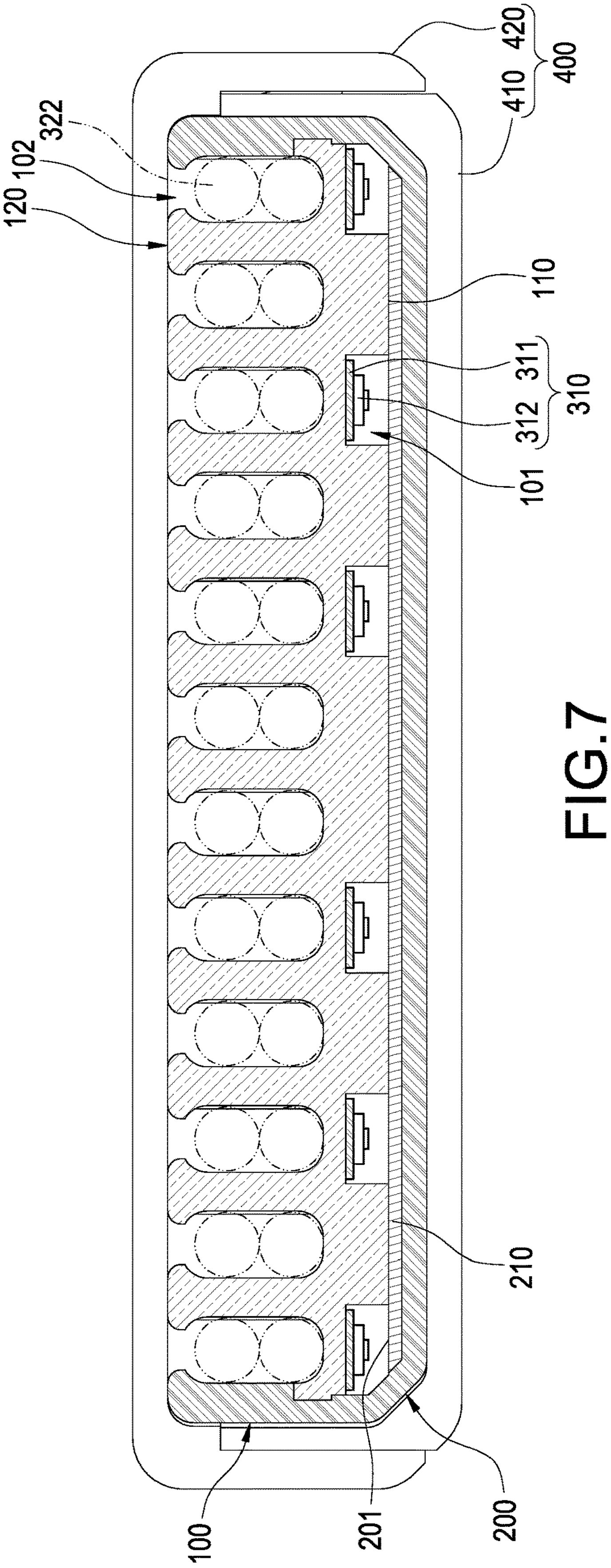
FIG. 7 is a perspective view showing an illumination flat cable device according to another embodiment of this disclosure.

According to another embodiment of the illumination flat cable device of this disclosure as shown in FIG. 7, the light-transmissive frame 100 has more cable channels 102 than the aforementioned embodiment. The number of the illumination strips 310 should not be limited in this disclosure, more illumination strips 310 and illumination channels 101 may be disposed corresponding to brighter or wider projection requirements, illumination channel 101 and the illumination strip 310 are disposed correspondingly in number, namely, the number of the illumination channel 101 should not be less than that of the illumination strip 310.

According to this embodiment, the illumination flat cable device has the reflective surface 201 for reflecting light projected from the illumination strip 310, so that the light may be uniformly spread from back sides of the conductive wires 321 through the light-transmissive frame 100.

While this disclosure has been described by means of specific embodiments, numerous modifications and variations could be made thereto by those skilled in the art without departing from the scope and spirit of this disclosure set forth in the claims.

What is claimed is:

1. An illumination flat cable device, comprising:

a light-transmissive frame, of a flat shape, and comprising an illumination side, a cabling side opposite to the illumination side, an illumination channel defined at the illumination side and arranged parallelly with a longitudinal direction thereof, and a plurality of cable channels arranged on the cabling side, wherein each cable channel is disposed in parallel with the longitudinal direction;

a reflective cover, arranged on the illumination side of the light-transmissive frame, and comprising a reflective surface configured to cover the illumination channel;

an illumination strip, arranged in the illumination channel, wherein a projecting direction of the illumination strip is arranged toward the reflective surface; and a flat cable, comprising a plurality of conductive wires arranged in parallel with each other and a pair of connectors, the conductive wires disposed in the cable channels respectively, and the pair of connectors disposed corresponding to a pair of end portions of the light-transmissive frame respectively.

2. The illumination flat cable device according to claim 1, further comprising a pair of clampers disposed on the end portions respectively, and the light-transmissive frame and the reflective cover are clamped by the clampers.

3. The illumination flat cable device according to claim 2, wherein each of the clampers comprises a first housing and a second housing, the first housing is connected with the reflective cover, the second housing is configured to cover the cabling side of the light-transmissive frame, and the first housing is buckled with the second housing.

4. The illumination flat cable device according to claim 2, wherein each of the clampers comprises a plurality of passages corresponding to the conductive wires, and the conductive wires are inserted in the passages respectively.

5. The illumination flat cable device according to claim 2, wherein each of the clampers comprises a tenon, the reflective cover comprises a mortise defined corresponding to the tenon, and the tenon is inserted in the mortise.

6. The illumination flat cable device according to claim 1, wherein the illumination strip comprises a circuit board and a plurality of light emitting diodes, the circuit board comprises an illumination surface, the light emitting diodes are disposed on the illumination surface, the circuit board is accommodated in the illumination channel, and the illumination surface is disposed to face the reflective surface of the reflective cover.

7. The illumination flat cable device according to claim 6, wherein the light emitting diodes are disposed in parallel with the longitudinal direction of the light-transmissive frame.

8. The illumination flat cable device according to claim 1, wherein the reflective cover comprises a reflective unit attached therein, and the reflective surface is disposed on the reflective unit.

9. The illumination flat cable device according to claim 1, wherein the conductive wires are exposed from the cabling side of the light-transmissive frame.

* * * * *